United States Patent [19]

Sugawara

[11] Patent Number: 5,348,245
[45] Date of Patent: Sep. 20, 1994

[54] DRAG STRUCTURE FOR FISHING REEL

[76] Inventor: Kenichi Sugawara, Junpu-ryo 408-go, Haze-cho 1600, Sakai-shi, Osaka, Japan

[21] Appl. No.: 796,832
[22] Filed: Nov. 25, 1991
[30] Foreign Application Priority Data Nov. 27, 1990 [JP] Japan .................. 2-126113[U]

[51] Int. Cl.$^5$ .............................. A01K 89/027
[52] U.S. Cl. .................... 242/246; 242/233
[58] Field of Search ........... 242/245, 246, 223, 233
[56] References Cited

U.S. PATENT DOCUMENTS

| 4,702,432 | 10/1987 | Kaneko et al. | 242/246 |
| 4,804,150 | 2/1989 | Takeuchi | 242/246 |
| 5,007,602 | 4/1991 | Carlsson | 242/246 |
| 5,149,007 | 9/1992 | Saito | 242/246 |

FOREIGN PATENT DOCUMENTS

2246060  1/1992  United Kingdom ............ 246/246

Primary Examiner—Katherine Matecki

[57] ABSTRACT

A drag structure for a fishing reel comprising a drag assembly, and a drag control element for contacting said drag assembly to produce a drag force. The drag control element is adjustably movable toward and away from said drag assembly and switchable between an operational position in which to vary the drag force and an inoperational position in which not to produce the drag force. The drag control element includes means for informing the angler that the drag control element is switched to the inoperational position.

4 Claims, 6 Drawing Sheets

DRAG STRUCTURE FOR FISHING REEL

BACKGROUND OF THE INVENTION

1. Field of the Invention

The present invention relates to a drag structure for a fishing reel, and more particularly to a drag structure comprising a drag control element contacting a drag assembly to produce a drag force, the drag control element being movable toward and away from the drag assembly thereby to switch between an operational position in which to vary the drag force and an inoperational position in which not to produce the drag force.

2. Description of the Related Art

With the conventional reels having the drag structure as noted above, the drag force is reduced when a fishing line having a small diameter is used. In particular, when a cuttle is fished at a breakwater, a saurel as a live bait is hooked in a point of a fishhook to allure the cuttle thereto. If a resistance is applied when the cuttle bites the saurel and tries to escape, the cuttle tends to release the bait. Therefore, it is required to feed out the fishing line without causing any resistance. In this condition, the drag force is free. After that, the drag force is slightly tightened to take up the fishing line. If the cuttle tries to escape again, the drag force is set to be free. While such a series of operations are effected, a lure hooked by the fishing line is slided to the cuttle. If the cuttle bites a hook hanger of the lure, the drag force is strongly tightened to wind up the fishing line. The lure as noted above is attached to the fishing line through a pair of suspender frames and movable along the fishing line. The hook hanger for picking up the cuttle is attached to an extreme end of a longitudinal frame interconnecting the suspender frames.

When the drag force is tried to be reduced, it is sometimes difficult for the angler to exactly grasp the condition only by a physical feeling based on a counterforce applied from the drag assembly through the drag control element. Particularly, in spinning reels, if a casting operation is carried out in a condition where the drag control element is moved away from the drag assembly not to produce the drag force without returning to the initial condition in which the drag force is produced, the drag control element and the drag assembly are removed from predetermined positions and tend to be cast with a trick device and finally lost.

SUMMARY OF THE INVENTION

A primary object of the present invention is to provide a drag structure for a fishing reel which can be used without any problems having a simple structure in consideration that the reel is used in a condition where a drag force is not produced or a drag force is reduced.

In order to fulfill the above-noted object, the present invention is characterized by means for informing the angler that the drag control element is switched to an inoperational position.

This structure has the following functions and effects.

When the drag control element is moved to switch to the inoperational position, the informing means is operated to notify the angler that the inoperational condition is established.

Thus, the angler can perceive the condition in which the drag force is not produced, thereby to take proper action, e.g. to tighten the drag control element. In addition, the drag force can be reliably reduced based on such perception.

Other objects, features and advantages will be apparent from the following description of the present invention referring to the accompanying drawings.

BRIEF DESCRIPTION OF THE DRAWINGS

The drawings illustrate a drag structure of a fishing reel according to the present invention, in which.

DETAILED DESCRIPTION OF THE PREFERRED EMBODIMENTS

A drag structure of a fishing reel embodying the present invention will be described in detail hereinafter referring to the drawings.

Figure 6:
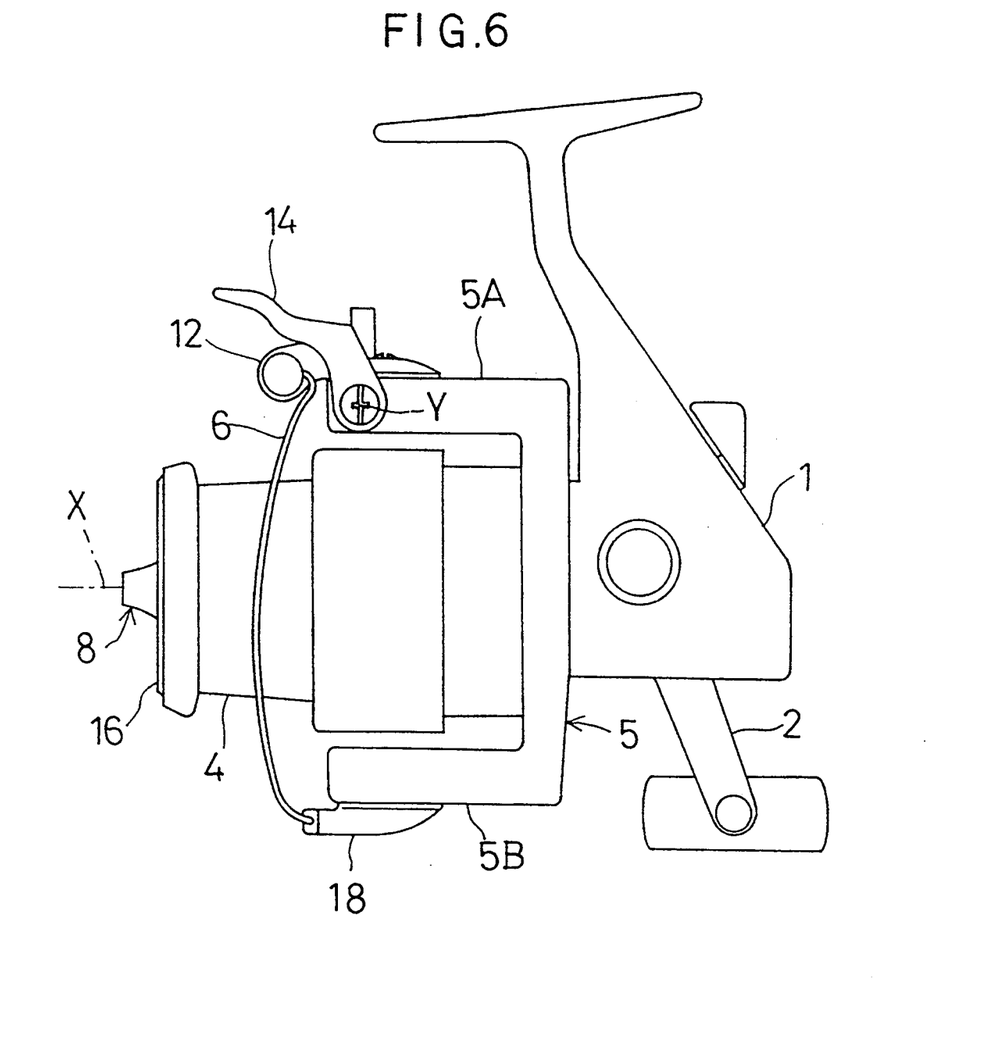
FIG. 6 is a side view of the spinning reel.

FIG. 6 shows a fishing reel comprising a reel body 1, a take-up handle 2 pivotably supported by the reel body 1, a spool shaft 3 unrotatably extending forwardly of the reel body 1, and a spool 4 relatively rotatable to and loosely fitted on the spool shaft 3. The spinning reel further comprises a rotary frame 5 mounted radially outwardly of the spool 4 to be rotatable by the take-up handle 2, and a bail arm 6 attached to the rotary frame 5.

Figure 1A:
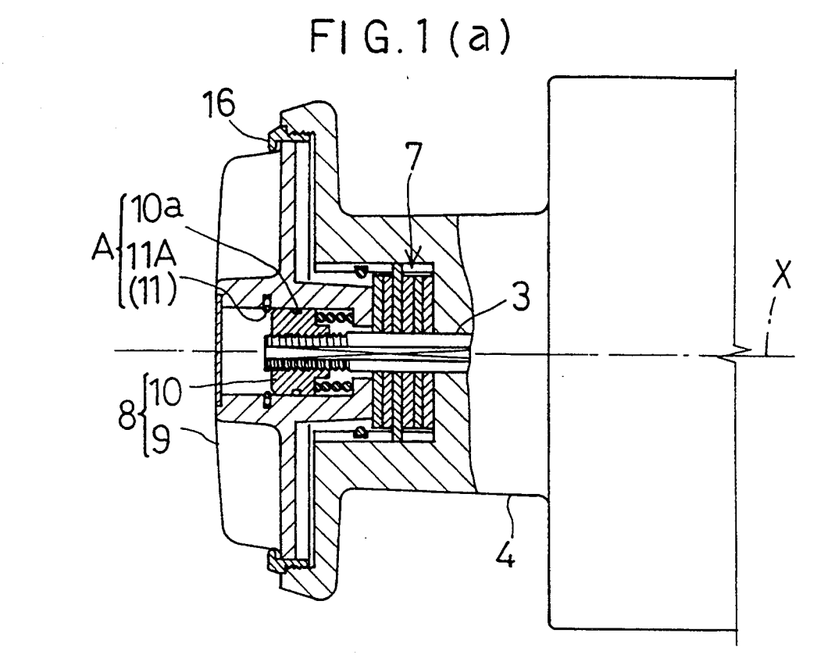
FIG. 1(a) is a vertical section of the drag structure in which a drag force is produced.
Figure 1B:
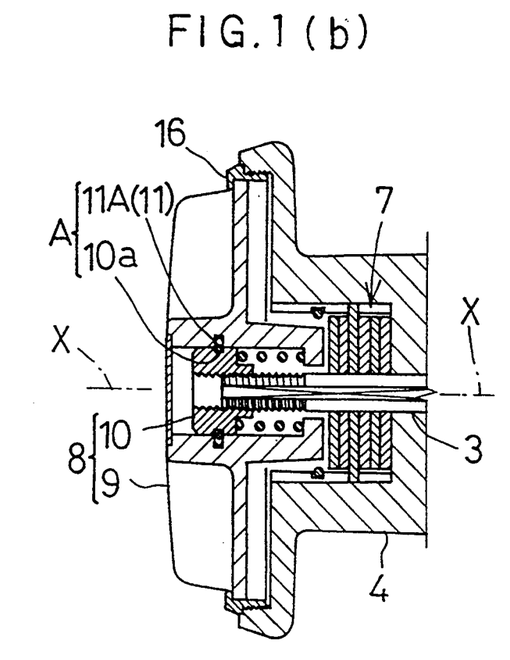
FIG. 1(b) is a vertical section of the drag structure in which the drag force is not produced.

Referring to FIG. 1, the spinning reel also includes a friction type multi-plate drag assembly 7 mounted between the spool shaft 3 and the spool 4, and a drag control element 8 contacting the drag assembly 7 to produce a drag force. The drag control element 8 includes a drag knob 9 to be pressed to the drag assembly 7 to produce a drag force, and a drag movable element 10 mounted inside the drag knob 9. The drag movable element 10 has a hexagonal outer periphery engageable with a hexagonal inner periphery of the drag knob 9. The drag movable element 10 is rotatable in unison with the drag knob 9 about an axis of the spool shaft. Also, the drag movable element 10 has an inner periphery screwed to the spool shaft 3 thereby to be axially movable with rotation of the drag knob 9.

Means A for informing the angler that the drag control element 8 is moved away from the drag assembly 7 and switched to an inoperational position in which not to produce the drag force will be set forth next.

Figure 2:
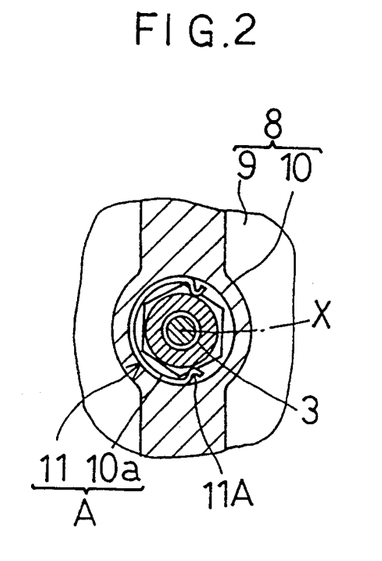
FIG. 2 is a vertical section in front view of the drag structure having a click spring.

As shown in FIGS. 1 and 2, the drag knob 9 defines a groove in an inner periphery thereof facing the drag movable element 10 for receiving a click spring 11.

On the other hand, the drag movable element 10 also defines an engaged groove 10a. When the drag knob 9 is moved away from the drag assembly 7, opposite ends 11A of the click spring 11 are shrunk to snap into the groove 10a, thereby to generate a click sound. Then, the angler can perceive that the drag control element 8 is switched to the inoperational position in which not to produce the drag force. The combination of the click spring 11 and the engaged groove 10a is referred to the informing means A.

A hook element 16 having a forward end portion engageable with the drag knob 9 is screwed at a front end portion of the spool 4. The forward end portion of the hook element 16 is fitted on a flange portion of the drag knob 9, thereby to prevent the drag knob 9 from falling off the spool when loosened too much.

Figure 3:
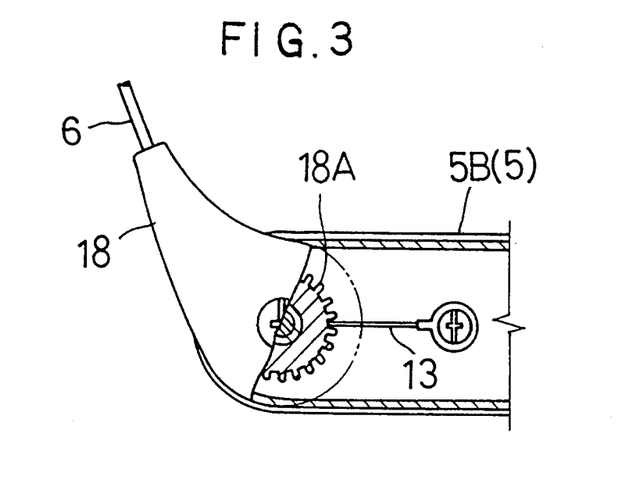
FIG. 3 is a partially broken-away side view of a click mechanism mounted on an arm.

An arm 18 pivotably supported by an extreme end of the rotary frame 5 will be set forth below.

As shown in FIG. 3, a gear 18A is defined inside the arm 18, while a cantilever spring 13 engageable with the gear 18A is supported within an arm carrying case 5B mounted on the extreme end of the rotary frame 5. Whenever the bail arm 6 is vertically oscillated, the arm 18 is rotated and the cantilever spring 13 is snapped by the gear 18A thereby to produce a click sound.

Figure 4:
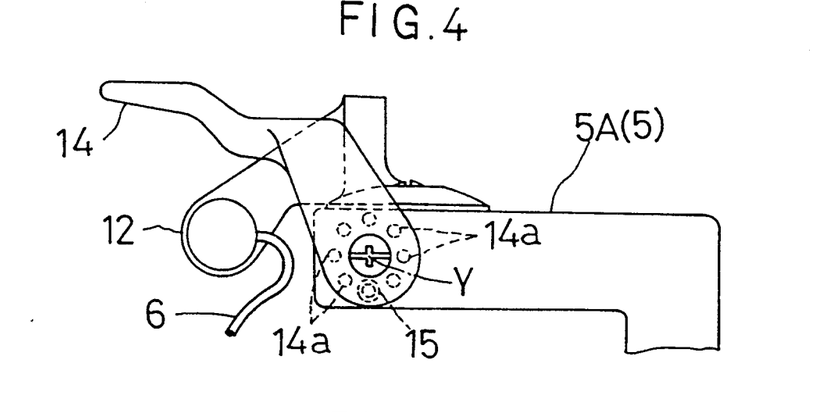
FIG. 4 is a side view of a click mechanism mounted on a quick changeover lever.
Figure 5:
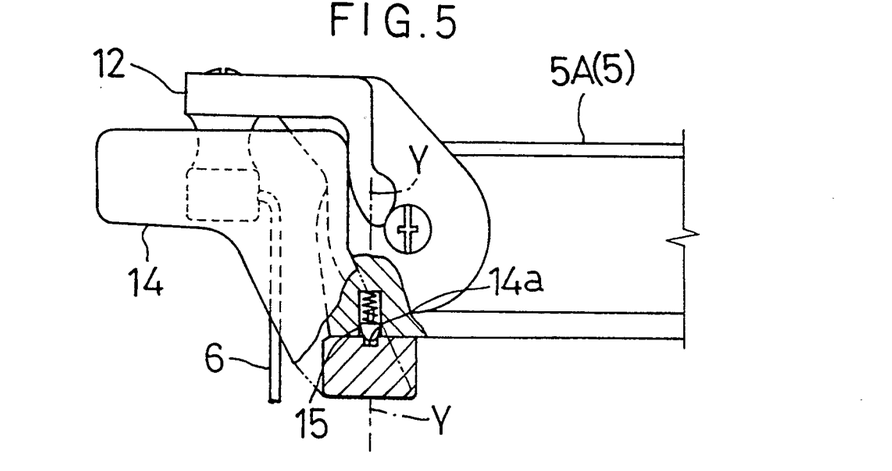
FIG. 5 is a partially broken-away plan view of FIG. 4.

A quick changeover lever 14 for switching the bail arm 6 to a fishing line feeding position will be described below.

Referring to FIGS. 4 and 5, the quick changeover lever 14 is supported at a lateral side face of a case 5A for carrying an arm cam 12 to be pivotable about a transverse axis Y. The quick changeover lever 14 has an inner surface opposing to the lateral side face of the arm cam carrying case 5A, the inner surface defining a plurality of engaged bores 14a. An engaging pin 15 engageable into one of the engaged bores 14a is inserted into the lateral side face of the arm cam carrying case 5A to urgingly project therefrom. When the quick changeover lever 14 is oscillated, the engaging pin 15 is snapped in and out of the engaged bores in rotation thereby to produce a click sound. The engagement between the engaging pin 15 and the engaged bore 14a allows the quick changeover lever 14 to be maintained in a oscillated position, which provides the quick changeover lever 14 with few chances to move at a casting operation. Thus, the quick changeover lever 14 less tends to return to the home position to hook the fishing line.

Other embodiments will be set forth below.

(a) The inoperational position where the drag force is not produced may be established by contact between the drag knob 9 and the drag assembly 7. In this condition, a thrust pressure of the drag knob 9 against the drag assembly 7 is zero.

Figure 7A:
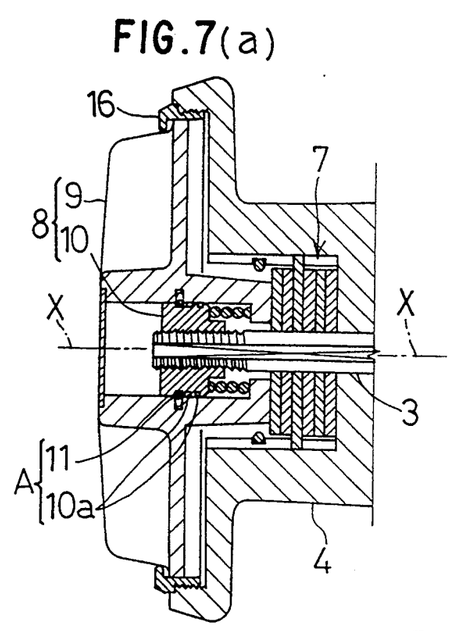
FIG. 7(a) is a vertical section corresponding to FIG. 1(a) which shows the drag structure according to another embodiment of the present invention.
Figure 7B:
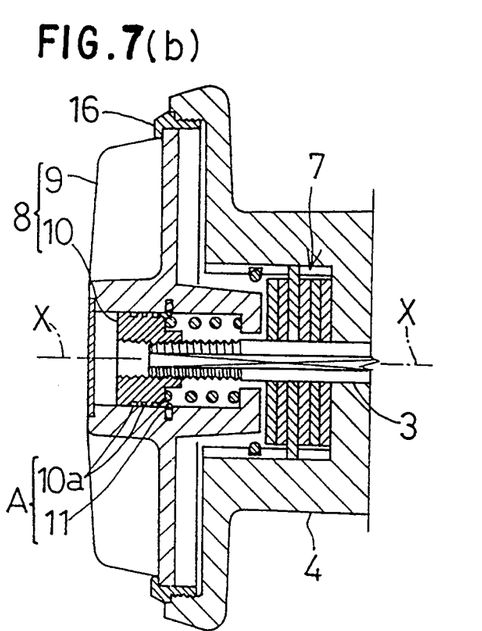
FIG. 7(b) is a vertical section corresponding to FIG. 1(b) which shows the drag structure according to another embodiment of the present invention.

(b) The informing means A may be practiced as follows. In FIG. 7(a), the drag movable element 10 similarly rotates in unison with the drag knob 9 through the hexagonal section and relatively moves in the axial direction X of the spool. The click spring 11 as shown in FIG. 2 is also utilized here, while a plurality of engaged grooves 10a are axially defined in outer peripheries of the drag movable element 10 for engaging the extreme ends 11A of the click spring 11. The relative movement of the drag movable element 10 in the axial direction X of the spool causes the click spring 11 to produce a click sound. When the drag knob 9 is moved away from the drag assembly 7 as shown in FIG. 7(b), the click sound is no more produced.

Figure 8:
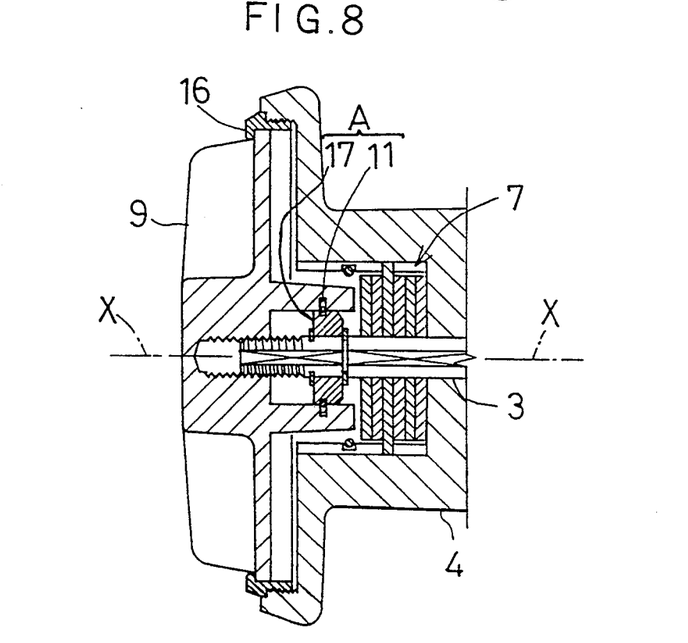
FIG. 8 is a vertical section showing the drag structure according to a further embodiment of the present invention.

(c) Referring to FIG. 8, a fixing element 17 may be mounted on the spool shaft 3, instead of the drag movable element 10. The informing means A may be mounted between the fixing element 17 and the drag knob 9 threadably movable relative to the spool shaft 3, thereby to produce a click sound with the drag knob 9 being distant from the drag assembly 7.

Figure 9:
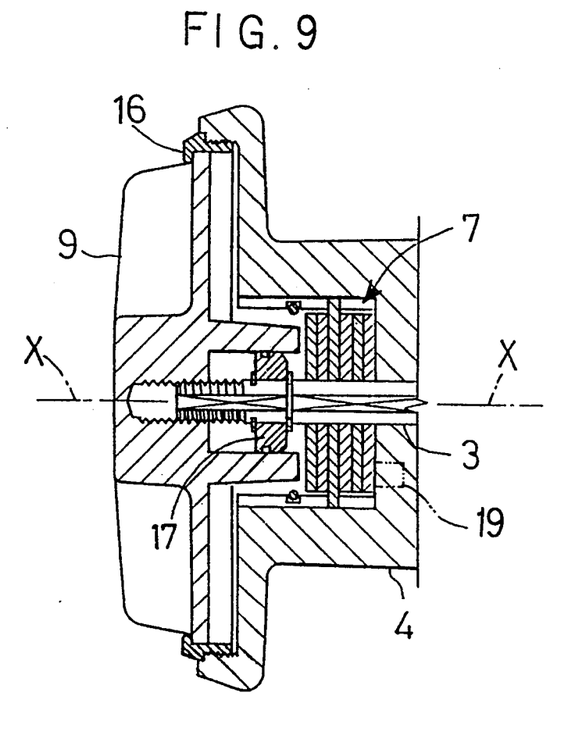
FIG. 9 is a vertical section of another embodiment of the present invention.
Figure 10:
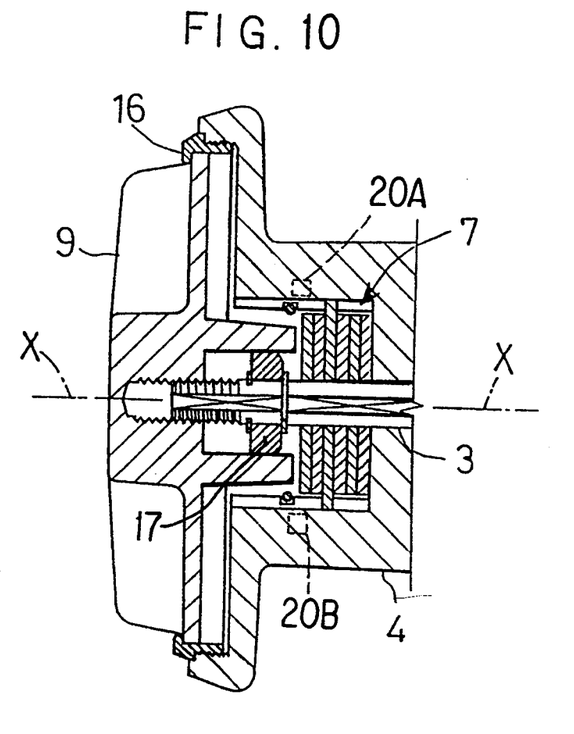
FIG. 10 is a vertical section of another embodiment of the present invention.

(d) Any detecting means may be provided for detecting that the drag control element 8 is moved away from the drag assembly 7, or is switched to the inoperational position in which not to produce the drag force. Referring to FIGS. 9 and 10, the spinning reel may include means 19 for detecting a pressure applied to the drag assembly as shown in a two-dot-and-dash line, and means having a light emitter 20A and a light receiver 20B as shown in a broken line for optically detecting the position of the drag control element 8. According to the detected information from these detecting means, any sound producing means such as a buzzer may be operated. Instead of the sound producing means, light emitting means may be employed. In addition, the position where the detecting means is mounted may be finely adjustable with the abrasion of the drag assembly 7.

(e) These mechanisms may be used in the drag assembly for casting reels, apart from the spinning reels.

It would be apparent that the present invention may be practiced in various ways within the scope of the appended claims.

What is claimed is:

1. A drag structure for a fishing reel comprising:
   a drag assembly; and
   a drag control element for contacting said drag assembly to produce a drag force, said drag control element being adjustably movable toward and away from said drag assembly to switch between an operational position in which to vary the drag force and an inoperational position in which not to produce the drag force;
   wherein said drag control element includes means for informing the angler that the drag control element is switched to the inoperational position; and
   wherein said drag control element further includes a drag knob for pressingly contacting said drag assembly to produce the drag force, and a drag movable element mounted inside the drag knob; and
   wherein said informing means includes a click spring and an engaged groove defined in an outer periphery of said drag movable element, said click spring having opposite ends shrunk to snap into said engaged groove when the drag knob moves away from the drag assembly, thereby to produce a click sound.

2. A drag structure as claimed in claim 1 wherein said drag movable element axially defines a plurality of engaged grooves in outer peripheries thereof engageable with the opposite ends of said click spring, said drag movable element being axially relatively movable thereby to cause said click spring to produce a click sound.

3. A drag structure as claimed in claim 1, further comprising a hook portion screwed to a forward end of a spool and having an engaging portion extending therefrom to said drag knob, said engaging portion having an extreme end engageable with a flange of said drag knob, thereby to prevent said drag knob from falling off the spool when slackened too much.

4. A drag structure for a fishing reel comprising:
 a drag assembly; and
 a drag control element for contacting said drag assembly to produce a drag force, said drag control element being adjustably movable toward and away from said drag assembly to switch between an operational position in which to vary the drag force and an inoperational position in which not to produce the drag force;
 wherein said drag control element includes means for informing the angler that the drag control element is switched to the inoperational position; and
 wherein said drag control element further includes a drag knob for pressingly contact said drag assembly to produce the drag force, and a drag movable element mounted inside the drag knob; and
 further comprising a hook portion screwed to a forward end of a spool and having an engaging portion extending therefrom to said drag knob, said engaging portion having an extreme end engageable with a flange of said drag knob, thereby to prevent said drag knob from falling off the spool when slackened too much.

* * * * *

UNITED STATES PATENT AND TRADEMARK OFFICE
CERTIFICATE OF CORRECTION

PATENT NO. : 5,348,245
DATED : September 20, 1994
INVENTOR(S) : Kenichi Sugawara It is certified that error appears in the above-identified patent and that said Letters Patent is hereby corrected as shown below:

On the title page:

Insert :

--[73] Assignee

SHIMANO INC., Osaka, Japan--.

Signed and Sealed this

Fourteenth Day of March, 1995

Attest:

BRUCE LEHMAN

Attesting Officer

Commissioner of Patents and Trademarks